US008418685B2

(12) United States Patent
Strauch

(10) Patent No.: US 8,418,685 B2
(45) Date of Patent: Apr. 16, 2013

(54) BARBECUE GRILL WITH VARIABLY POSITIONED FOOD BASKET

(76) Inventor: Jan Eric Strauch, Wolcott, CO (US)

( * ) Notice: Subject to any disclaimer, the term of this patent is extended or adjusted under 35 U.S.C. 154(b) by 250 days.

(21) Appl. No.: 12/784,445

(22) Filed: May 20, 2010

(65) Prior Publication Data

US 2010/0297321 A1  Nov. 25, 2010

Related U.S. Application Data

(60) Provisional application No. 61/180,130, filed on May 20, 2009.

(51) Int. Cl.
*F24B 1/26* (2006.01)
*F24B 1/182* (2006.01)
*F24C 7/04* (2006.01)

(52) U.S. Cl.
USPC .......... 126/25 R; 126/25 A; 126/25 AA; 126/41 R; 126/41 A; 126/41 B; 99/326; 99/329 P; 99/340; 219/387; 219/391; 248/298.1

(58) Field of Classification Search ........... 126/25 R, 126/25 A, 25 AA, 41 R, 41 A, 41 B, 41 C; 99/326, 329 P, 340, 426, 427, 443 R, 477; 219/387, 391, 392, 404; 248/298.1, 295.11, 248/324; F24B 1/26, 1/18; F24C 7/04
See application file for complete search history.

(56) References Cited

U.S. PATENT DOCUMENTS

| | | | |
|---|---|---|---|
| 47,176 A | 3/1865 | Wetmore | |
| 457,316 A * | 8/1891 | Gibbons | ............... 99/392 |
| 1,398,157 A | 11/1921 | Segar | |
| 1,656,181 A * | 1/1928 | Elbert | ............... 126/14 |
| 1,734,611 A * | 11/1929 | Chandler | ............... 219/540 |
| 1,772,171 A * | 8/1930 | Wells | ............... 99/390 |
| 1,773,109 A * | 8/1930 | Mccaig et al. | ............... 99/337 |
| 1,903,324 A * | 4/1933 | Codling | ............... 99/392 |
| 1,996,297 A * | 4/1935 | Langenfeld | ............... 99/332 |
| 2,109,079 A * | 2/1938 | Zeigler et al. | ............... 126/41 R |
| 2,314,772 A | 3/1943 | Corra | |
| 2,335,217 A | 11/1943 | Tate | |
| 2,441,190 A | 5/1948 | Fuller | |
| 2,821,187 A * | 1/1958 | Tescula | ............... 126/25 A |
| 2,923,229 A | 2/1960 | Halford | |
| 2,946,275 A | 7/1960 | Compton | |
| 2,975,698 A * | 3/1961 | Miller | ............... 99/390 |

(Continued)

FOREIGN PATENT DOCUMENTS

| | | |
|---|---|---|
| DE | 3641694 A1 * | 6/1988 |
| EP | 69187 A1 * | 1/1983 |
| JP | 01235551 A * | 9/1989 |

*Primary Examiner* — Steven Leff
*Assistant Examiner* — Daniel E Namay
(74) *Attorney, Agent, or Firm* — Kyle W. Rost

(57) ABSTRACT

A barbecue grill provides a top cooking level and a central cooking zone located below the top cooking level. Lateral heat panels warm the central cooking zone. A food basket is configured to be opened and loaded with foodstuff when in an approximately horizontal position at the top cooking level. An elevator mechanism lowers the filled food basket into the central cooking zone while converting the food basket to an approximately vertical position. The food cooks while the basket is vertical. The elevator mechanism raises the basket of cooked food to the top cooking level while converting the food basket to approximately horizontal position. A user-operated control selectively actuates the elevator mechanism to move the food basket in either direction.

17 Claims, 6 Drawing Sheets

U.S. PATENT DOCUMENTS

| | | | |
|---|---|---|---|
| 3,018,772 A | 1/1962 | Blazey | |
| 3,090,372 A | 5/1963 | Evans | |
| 3,091,170 A | 5/1963 | Wilson | |
| 3,140,651 A * | 7/1964 | Barnett | 99/339 |
| 3,182,585 A | 5/1965 | Rensch et al. | |
| 3,276,351 A | 10/1966 | Sundholm | |
| 3,302,555 A | 2/1967 | Burwell | |
| 3,358,585 A | 12/1967 | Scherer | |
| 3,742,838 A | 7/1973 | Luschen et al. | |
| 3,835,760 A * | 9/1974 | Rekesius | 99/331 |
| 4,120,237 A | 10/1978 | Mecherlen | |
| 4,317,441 A * | 3/1982 | Berg | 126/41 R |
| 4,561,418 A | 12/1985 | Cairns | |
| 4,619,190 A * | 10/1986 | Smith | 99/393 |
| 4,944,282 A | 7/1990 | Aguiar | |
| 5,146,842 A | 9/1992 | Romano | |
| 5,353,694 A * | 10/1994 | Fins | 99/393 |
| 5,458,053 A | 10/1995 | Hsiao | |
| 5,499,574 A | 3/1996 | Esposito | |
| 5,660,101 A | 8/1997 | Cirigliano | |
| 5,836,295 A | 11/1998 | Faraj | |
| 5,921,172 A * | 7/1999 | Kiczko et al. | 99/416 |
| 6,182,560 B1 | 2/2001 | Andress | |
| 2008/0135038 A1* | 6/2008 | Michel et al. | 126/25 A |
| 2010/0282235 A1* | 11/2010 | Lu | 126/25 R |
| 2012/0255449 A1 | 10/2012 | Bair | |

* cited by examiner

BARBECUE GRILL WITH VARIABLY POSITIONED FOOD BASKET

BACKGROUND OF THE INVENTION

1. Field of the Invention

The invention generally relates to food and beverage apparatus, especially to broilers with opposed heaters. In another aspect, the invention relates to cooking stoves of the type generally referred to as braziers, suited for cooking with rotating and elevating.

2. Description of Related Art Including Information Disclosed Under 37 CFR 1.97 and 1.98

Outdoor cooking stoves or grills, often referred to as braziers or barbecue grills, enable the convenient preparation of foods in almost any location ranging from a backyard patio to a campground. These types of stoves are vastly popular for numerous reasons and have gathered a following of aficionados. Among the many reasons for this popularity is the removal of smoke and heat from the kitchen or living area, which causes the outdoor grill to be a highly appropriate cooking device in warm climates and summer season. The release of cooking heat into an outdoor locale is inconsequential to indoor comfort, which frees the chef to exercise greater creativity in cooking techniques than might be unwelcome within an indoor kitchen. Thus, chefs have increased freedom to apply sauces to the food and to employ smoke-inducing fire additives that generate scented smoke to significantly enhance flavor.

One of the few drawbacks to cooking on an outdoor grill is that it requires more attention than typical indoor cooking on appliances with sophisticated electronic controls. The outdoor cooking grill typically provides a gridiron surface for supporting the food and has a flame under the gridiron and food. This arrangement results in a tendency for fats and sauces to drip into the flame. Because the position of a gridiron is usually immediately above the fire, the drips add fuel to the fire and cause flare-ups. The disadvantage resulting from flare-ups is that such random and unpredictable bursts of extra heat can char the food very quickly, often before the chef notices. Another disadvantage is that heat is regulated with low precision and with little knowledge of accurate heat level. At best, an outdoor grill might have a simple thermometer on the grill hood, which tells little about temperatures at the gridiron. In fuel gas grills, changing the height of the gas flame makes the adjustment. In charcoal fueled grills, the adjustment is made by advance selection of how much combustible charcoal fuel will be ignited for the cooking session. In either or both types of grill, the height of the gridiron above the fire might be variable. All of these adjustments have speculative impact on temperature at the gridiron. An unexpectedly hot fire can char the food before the chef realizes how hot the fire has become, while a cooler than expected fire can extend the cooking time or result in undercooked food.

Techniques for solving some of these problems are known but related problems appear to have prevented their practical use. One solution to the problem of flare-ups is to move the heat source away from the usual under-food position to a lateral position. Modern barbecue grills utilize this solution only with the rotisserie unit by providing a backside heat source. Unfortunately, as a practical matter, this solution is almost unknown for application to foods cooked on the gridiron surface. However, several examples from prior patent art show that lateral fire placement is a known technique. The following United States patents demonstrate the state of this art.

U.S. Pat. No. 47,176 to Wetmore, which dates back to the Civil War era, shows a heat panel holding burning wood or coal. A vertical press basket holding food is placed in front of the heat panel. The entire heat panel is set in the door of a cooking stove to assist in maintaining a fire. While this patent suggests cooking from only one side, it appears to be an early teach of the vertical cooking technique.

U.S. Pat. No. 1,398,157 to Segar shows a gas fired "griller." This British terminology evidently refers to an indoor style of oven rather than a barbecue grill. The griller employs opposed vertical heat sources with a vertical food basket. A conveyor belt supports food in vertical holders and conveys the food through a cooking zone between the heat panels.

U.S. Pat. No. 2,314,772 to Corra shows a grill with opposed, vertical charcoal burners and a central press basket. A notable feature is a mechanical control employing a spreading linkage for adjusting the spread of the charcoal burners to control heat in the cooking zone.

U.S. Pat. No. 2,335,217 to Tate shows a grill with opposed vertical charcoal burners with a central rotisserie positioned in the cooking zone.

U.S. Pat. No. 2,441,190 to Fuller shows a barbecue grill with vertical fireboxes and with notched or serrated adjustments for positioning the fireboxes at predetermined intervals of closeness to the cooking zone. A food basket fits in the cooking zone between the fireboxes. End plates support the food basket in guide slots that hold the basket in vertical position in the cooking zone between the fireboxes.

U.S. Pat. No. 2,923,229 to Halford shows a grill with charcoal burning heat panels at opposite sides of a cooking zone. An ash drawer below each heat panel aids cleaning. A vertical press basket is inserted into the cooking zone from the front of the grill, between the heat panels. This grill combines a separate top grid for horizontal cooking.

U.S. Pat. No. 2,946,275 to Compton shows a grill with vertical heat panels and a vertical press basket, all supported from a set of rails allowing movement among these components for regulating heat in the central cooking zone.

U.S. Pat. No. 3,091,170 to Wilson discloses a charcoal grill that uses a reduced amount of charcoal. Opposed heat panels employ reflector surfaces to reflect heat toward the central cooking zone from a small amount of charcoal on the floor of each heat panel. A food basket is supported for rotisserie motion and also can be locked into various static rotational positions within the cooking zone U.S. Pat. No. 3,182,585 to Rensch et al shows a grill with vertical heat panels and a vertical food basket between them. A handle on the food basket can adjust the separation between the food basket and heat panels.

U.S. Pat. No. 3,276,351 to Sundholm shows a cooker with opposed, variably separable fireboxes holding charcoal. Food is clamped in a basket, and hanger rods suspend the basket vertically between the fireboxes. A pan collects ashes and drippings.

U.S. Pat. No. 3,358,585 to Scherer shows opposed heat panels each with its own ash drawer, and a central trough that catches drips.

U.S. Pat. No. 3,302,555 to Burwell shows a vertical grill basket exposed to opposed upright cylinders filled of burning charcoal. A central drip pan catches both drippings and ash.

U.S. Pat. No. 3,742,838 to Luschen et al shows a vertical grill with a drain for drippings that extends to an external catch pan.

U.S. Pat. No. 4,120,237 to Mecherlen shows opposed heat panels and a central rotisserie press basket in the cooking zone.

U.S. Pat. No. 4,561,418 to Cairns shows a combination of opposed heat panels with a central press basket. These components slide on a rail such that the press basket remains centered in the cooking zone between the heat panels.

U.S. Pat. No. 5,836,295 to Faraj patent shows a grill with opposed fireboxes in a central cooking basket that folds for storage.

While variably separated vertical heat panels are helpful for controlling flare-ups and simultaneously cooking food from two sides, the placement of food in a press basket between two heat sources presents a problem. The hot cooking zone tends to be unbearable to human hands, which restricts the chef's customary free access to the food on an outdoor grill. Although long handled tools can be used for some purposes, such tools are not the answer to all aspects of the problem. The two-sided heat source creates the very hot and hostile atmosphere near the food, regardless of whether the food is in a fixed position basket or a rotating in rotisserie basket. In the prior art, the hot conditions in the cooking zone require that the press basket be lifted from its support structures to remove it from the cooking zone for many types of attention. Lifting a hot basket full of food is awkward and difficult. Once the hot basket has been lifted from the cooking zone, the chef faces a further problem of locating a suitable surface to receive the basket with its cargo of hot food, dripping with cooking juices. If the chef wishes to add a sauce, he likely must perform this task at a location remote from the grill, creating the additional problem of handling and transporting a basket of food that now is dripping with sauce. Similarly, filling or emptying a press basket likely must be performed at a remote location from the grill, due to the problem of unbearable heat present in the cooking zone.

These restrictions and difficulties in food handling with a two-sided vertical cooking grill may account for the evident lack of success for this type of grill. The inventor has found not a single example of such a grill to be commercially available, despite the several patents relating to vertical grills. Therefore, a likely conclusion is that chefs have found such grills to be unsatisfactory due to the unsolved problems of convenient and ready food handling that is enjoyed with common top-gridiron barbecues.

It would be desirable to resolve the problems of food handling in a grill employing a central cooking zone between vertical heat panels. In particular, it would be desirable to have a means to load and empty a food basket without unduly risking discomfort and burns to the chef's hands, and without having to remove the basket from the grill. Similarly, it would be desirable to have a means for the chef to access the food to apply sauces and the like during the cooking session without unduly risking discomfort and burns to the chef's hands and without having to remove the basket from the grill.

To achieve the foregoing and other objects and in accordance with the purpose of the present invention, as embodied and broadly described herein, the method and apparatus of this invention may comprise the following.

BRIEF SUMMARY OF THE INVENTION

Against the described background, it is therefore a general object of the invention to provide a barbecue grill that simultaneously cooks food from two sides in a vertical orientation, while providing access to the food similar to that available on a top grill.

According to the invention, a barbecue grill is formed of a housing that provides a top cooking level suitable for supporting a gridiron and provides space below the top cooking level. At least two opposed heat panels are located in the space below the top cooking level. The heat panels are laterally spaced apart to establish a central cooking zone between the heat panels and below the top cooking level. The heat panels are oriented to direct cooking heat laterally into the central cooking zone. A food basket is variably oriented with respect to the housing in either an approximately horizontal position or an approximately vertical position. The food basket is suitably configured to be opened and loaded with foodstuff when in the approximately horizontal position and is suitably configured to retain foodstuff when in either position. Further, the food basket is suitably sized to at least partially fit in the central cooking zone when in the approximately vertical position. A moving device is suited to bidirectionally move the food basket between the approximately horizontal position and the approximately vertical position. The moving means locates the food basket near the top cooking level when the food basket has been moved to the approximately horizontal position, and the moving means locates the food basket in the central cooking zone when the food basket has been moved to the approximately vertical position. A user-operated control selectively actuates the moving means to move the food basket toward a selected position.

According to the method of the invention, the food is loaded into the basket while the basket is supported in a horizontal, top position. After food has been loaded into the basket and a lid has been closed against it, the basket is conveyed and reoriented via a guide mechanism to a dropped, vertical position between opposed vertical heat panels on opposite sides of the dropped position. The heat panels cook the food. The basket is selectively conveyed back to horizontal, top position for intermediate treatment, such as with spices or sauces, optionally followed by return to dropped position. At the conclusion of cooking, the basket is selectively conveyed back to horizontal, top position for final emptying at the conclusion of cooking.

Subjacent drawers or reservoirs collect residues from the heat panels and drippings from the food. The reservoirs are extracted on tracks or guides for cleaning.

The accompanying drawings, which are incorporated in and form a part of the specification, illustrate preferred embodiments of the present invention, and together with the description, serve to explain the principles of the invention. In the drawings:

DETAILED DESCRIPTION OF THE INVENTION

Figure 1:
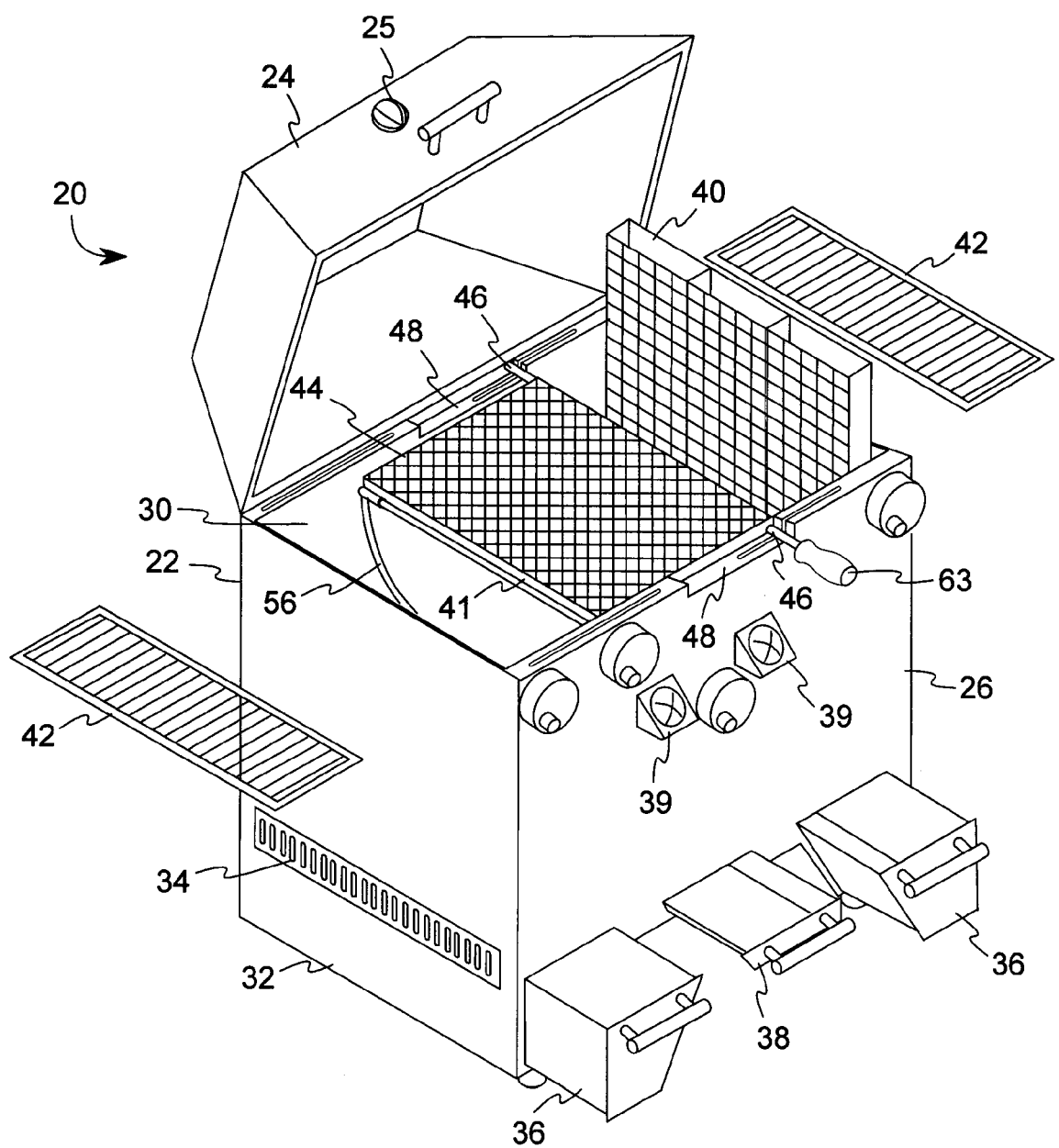
FIG. 1 is an exploded isometric view of the barbecue grill, taken from the left front upper viewpoint and showing the food basket in horizontal position.

The invention is a barbecue grill and a method for grilling and handling food in an outdoor barbecue grill. The terms, "barbecue," "barbecue grill," and several abbreviations and variations are both a method and apparatus for cooking food. In this description, these words chiefly will refer to the apparatus as a whole, unless context indicates otherwise. The barbecue grill of the invention is of the type that cooks food held in a carrier that can be supported in a vertical orientation between a pair of opposed heat sources at two opposite sides of the food carrier. Between the opposed heat sources, the grill defines a main heat zone where temperatures are at a maximum for cooking. The carrier is connected to a remote, pivoting elevator mechanism. By suitably operating the elevator mechanism, it becomes possible to conduct the grilling process by improved control over the relationship of the food to the heat sources and to the main heat zone.

The barbecue grill provides a press basket for receiving and holding food. Characteristically, a press basket has two opposed major faces spaced apart for retaining foodstuff between them. Sufficient peripheral surfaces near the edges of the major faces assist in retaining the foodstuff. Such baskets tend to be wide and thin, so that a large proportion of contained foodstuff is exposed at the major faces. For loading, the basket can be supported at a loading station in conventional, approximately horizontal orientation. The top major face is a press lid that can be removed or opened. A key feature of the horizontal position at the loading station is an elevation above the main heat zone so that such operations as opening the basket, loading the basket, closing the basket, and applying sauces or the like to the food in the basket are carried out in a reduced temperature zone as compared to the main heat zone. Significantly, the loading station is above the main heat zone so that food bits, dripping sauces and the like will fall through the main heat zone, making the process of loading or treating the food into an enhancement of the cooking and flavoring process. The grill is configured to capture any drips or foot bits that survive the main heat zone, making the process of loading or treating the food into a clean and contained process.

After food is loaded into the basket, the press lid is closed against it. The rotating elevator is operated to reorient the press basket to an approximately vertical position. A guide mechanism both establishes the vertical position and maintains the vertical position as the elevator changes the height of the press basket with respect to the main heat zone. The loaded press basket is lowered into the main heat zone for cooking the food, if desired.

The end positions for the press basket are described as "approximately" horizontal and vertical. These terms are intended to be general, with "horizontal" referring to a suitable position for loading foodstuff into the press basket, and with "vertical" referring to a position where the major faces of the press basket have significant exposure to the laterally disposed heat sources.

As an alternative, the loaded press basket or top grilling surface can be maintained in a top cooking zone above the main heat zone for use with conventional grilling methods in which food is supported above a heat source. Both a top grilling surface and a lowered press basket are simultaneously available for cooking. Both grilling methods would be used simultaneously, for example, to prepare different foods that are better cooked by one or the other. Meats might be better prepared in the press basket, lowered into the main heat zone; while vegetables might be better prepared on the top grill in a zone that is less hot.

The opposed heat sources are located below the top grill and on opposite sides of the lowered press basket, where the heat sources provide heat to both the main heat zone and the top zone. The heat sources can employ any energy source suited for cooking. For example, a fuel gas such as propane gas or natural gas might fuel the heat sources. The panels may by of the type known as infrared burners, which can burn conventional gases. Such panels might be heated by electricity, or they may be heated by burning a solid fuel such as charcoal. The heat panels might be moveable toward and away from the main heat zone to regulate temperature and cooking characteristics. The orientation of the heat panels might be described as vertical or approximately vertical, reflecting that these panels serve a central cooking zone defined between them. However, the orientation of these panels can vary considerably, as heat might be directed both centrally and upwardly to an overhead gridiron or warming shelf.

Subjacent drawers or reservoirs collect residues from the heat panels and drippings from the food. The reservoirs are extracted on tracks or guides for cleaning.

Figure 2:
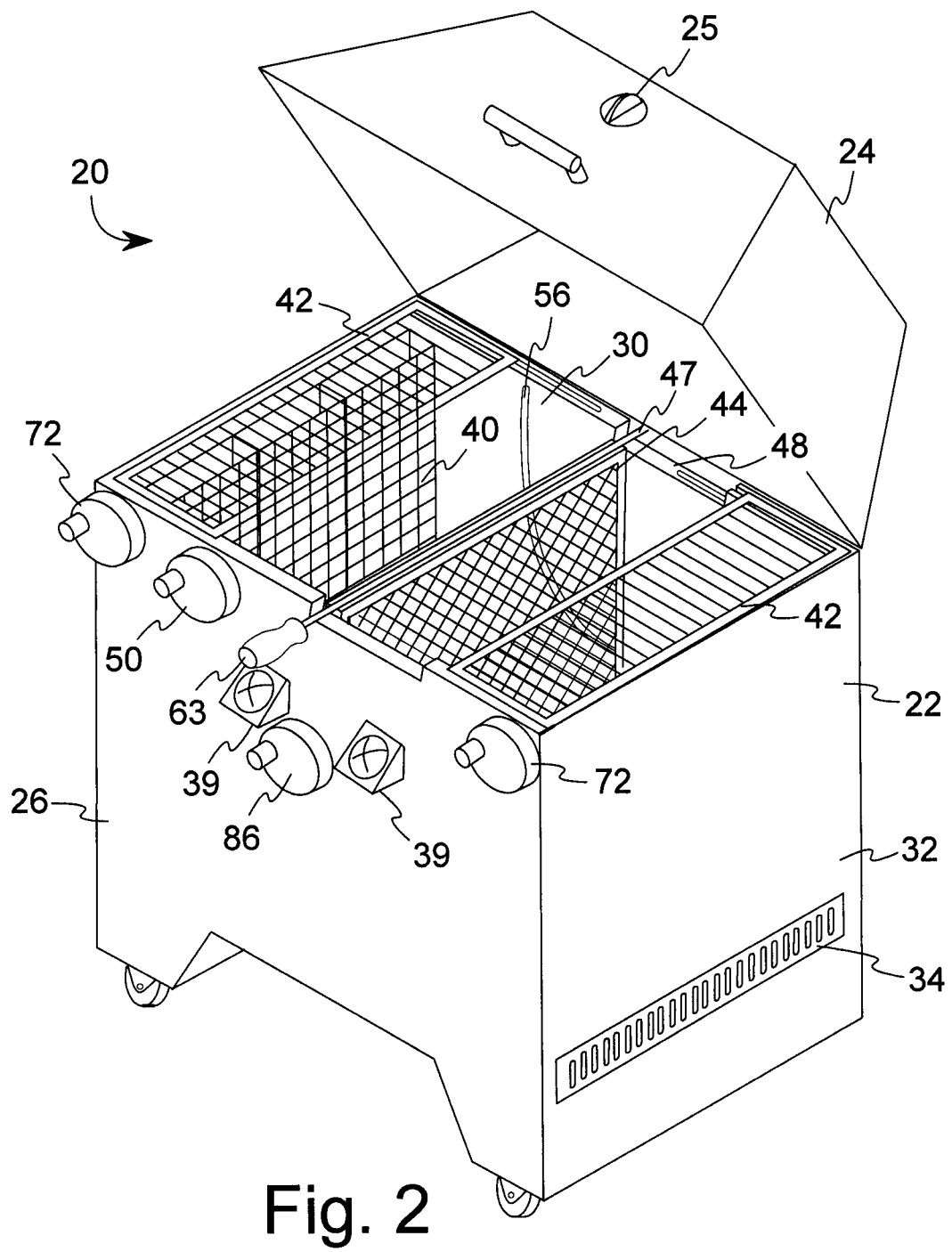
FIG. 2 is an isometric view of the barbecue grill, taken from the right front upper viewpoint and showing the food basket in vertical position.

The drawings illustrate a best mode of the invention. FIGS. 1 and 2 show an overview of a suitable barbecue 20, embodying the improvements of the invention. This apparatus 20 is of the type often referred to as a barbecue grill, fire pit, or outdoor stove. Conventional components include a housing 22 that contains the cooking apparatus. A pivotable lid 24 optionally closes the housing as an aid to cooking and for excluding debris during storage. A timer 25 is conveniently located on the lid, above the lid handle. The general shape of the housing can be varied as a matter of design, although the illustrated shape is appropriate for accommodating the functional components contained within the housing. Thus, a front wall 26, rear wall 30, and opposite side walls 32 form the housing.

The housing provides lower air vents 34 for admitting combustion air and for aiding the upward flow of warm air from the heat panels. A pair of ash drawers 36 is located below the positions of the opposed heat panels for catching any combustion residue, especially ash from burning charcoal. A central dripping drawer 38 is below the main heat zone, between the positions of the heat panels, for catching food residues. As suggested by the extended drawer position in FIG. 1, the drawers are removable for ease in emptying and cleaning. The housing carries one or more temperature gauges 39 located below the top grilling surface. This placement allows the temperature gauges to monitor cooking conditions in the main cooking zone of the grill, as further described, below.

The inner components of barbecue grill 20 include the opposed heat panels 40, top gridirons or warming shelves 42 near each side of the housing, and a central food carrier or cooking support 44 between the shelves 42. The central cooking support might be a gridiron or a rotisserie but typically will be a press basket 44 suited to carry food. The food carrier will be referred to as a press basket as a preferred example but not a limitation as to the types of food holders suited for use with this barbecue. Suitable guides and controls are mounted on and carried by the housing 22 for selectively orienting and reorienting the position of the press basket, for varying the positions of the heat panels, and for regulating the fuel source where required, such as when the fuel source is electricity or fuel gas.

Suitable means and mechanisms for orienting and reorienting the press basket 44 is a bidirectionally pivoting elevator mechanism. Similarly, the housing carries suitable means and mechanisms for moving heat panels 40 toward and away from one another. These various means and mechanisms are protected from contamination and exposure to high internal operating temperatures of the barbecue grill 20, especially from exposure to the heat of the main cooking zone between the heat panels. Thermal protection is desirable for maintaining the temperature of control wheels at a level suitable for handling by hand. In addition, it is desirable to maintain clean operating chains, sprockets, and other linkages so that mechanisms operate freely and without binding that might be result from contamination by ash or foodstuff.

One suitable means for protecting mechanisms from heat and contamination is a double housing or a double panel wall structure that at least partially contains the mechanisms in a gap between the two wall portions and thereby shields the mechanisms from heat and contamination. The housing 22 may be constructed of double walls in one or more locations to provide both contamination and thermal protection. In one embodiment, the front wall 26 and rear wall 30 are double walls that define a gap between inside and outside wall portions of each. The gap houses various sprockets, gears, and guided chains for moving a press basket, rotisserie, and heat panels. The double walls are open at top and bottom to provide cooling airflow by thermal convection. In another embodiment, a gearbox or housing replaces the inner wall of the described double wall construction and serves as an alternate suitable means for shielding the mechanisms from heat and contamination.

The press basket 44 is supported for positioning in either an approximately horizontal orientation or an approximately vertical orientation. The basket is further supported and connected to the housing 22 by suitable means for selective movement between the two positions. Such movement may be applied to one side edge 41 of the press basket 44 whereby the side edge is lowered into the main cooking zone to reorient the press basket into an approximately vertical position while the opposite edge remains substantially at a fixed height near an upper level of the housing, such as in recess 48. At least the portion of the press basket that is lowered into the main cooking zone is of suitable size to fit between front and rear walls of the housing, while the portion of the press basket that remains at the upper level may be wider or may carry an appendage wider than the main cooking zone.

Figure 3:
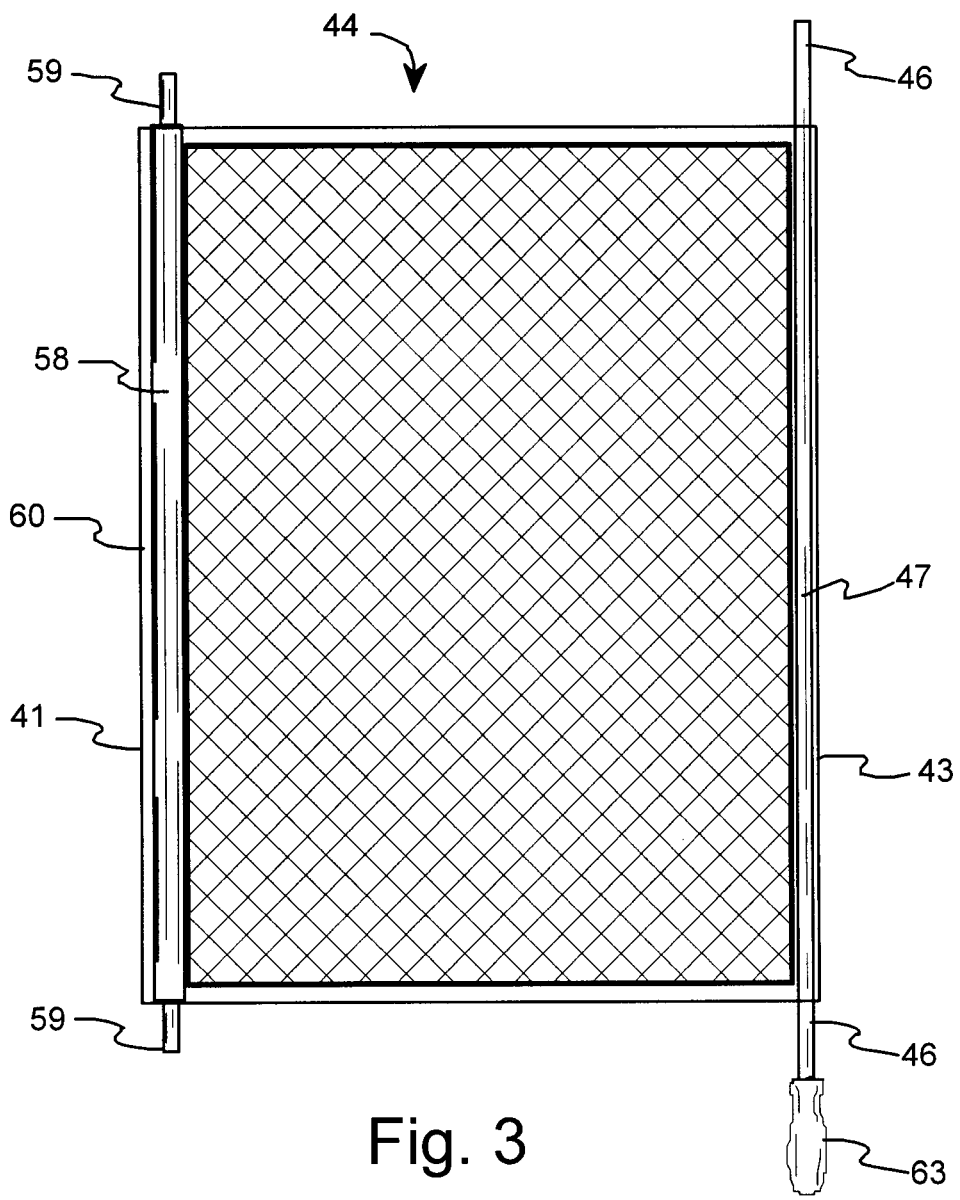
FIG. 3 is a top plan view of a food basket in horizontal position.

For example, in FIG. 3 the right side edge 43 of the press basket 44 includes pivot means such as support pins 46 or rod 47 that extend beyond the front and rear ends of the press basket to rest on top of front wall 26 and rear wall 30, such as in recess 48 best shown in FIGS. 1 and 2. Support pins 46 may be attached as ends of a central rod 47 inserted through the basket, or the pins may be independent structures joined to the basket. The top edge of front and rear walls 26, 30 may include a special edge configuration 48 for receiving pins 46 and maintaining them along a limited portion of the top edges of walls 26, 30 while allowing the basket to pivot either with the pins or on the pins.

Suitable special support configurations for receiving the pins are an elongated, recessed edge 48 oriented from side-to-side in the top edge of each wall. Other useful support configurations might be a socket in at least one wall matched with a slot with a detent in the opposite wall, a spring clip on one or both walls, or other types of clips, clamps, retainers, or holders. While these means are described as cooperating elements for supporting pins 46, the pivot means of the basket structure may be other than such pins. As a further example, the basket 44 may include eyes or rings in place of the pins 46. The housing 22 might be provided with hooks that engage such eyes or rings. These and other combinations of supports can enable the basket to pivot at one edge while maintaining the pivot edge substantially at a fixed height with respect to the housing 22.

With reference to the orientation of parts shown in FIG. 3, in a further example the left side edge 41 of basket 44 is short enough to fit between the front wall 26 and rear wall 30, which enables the left edge 41 of the basket to move vertically between the front and rear walls of the housing 22. Controls and linkages that are sheltered between the inside and outside double wall portions, where used, of front and rear walls 26, 30 can engage the basket 44 near the left side edge to pivot the basket as desired. Where such controls and linkages are housed in a gearbox or separate housing, they may similarly engage basket 44 for pivotal movement.

Control mechanisms can be located in any of the front wall gap, rear wall gap, front or rear separate housing, front or rear gear box, or any combination of these. For purposes of example, control mechanisms are described below in terms of location in the front wall gap, with equivalent mechanism in the rear wall gap. Transverse elements connect the front and rear mechanisms for synchronized operation.

Figure 4:
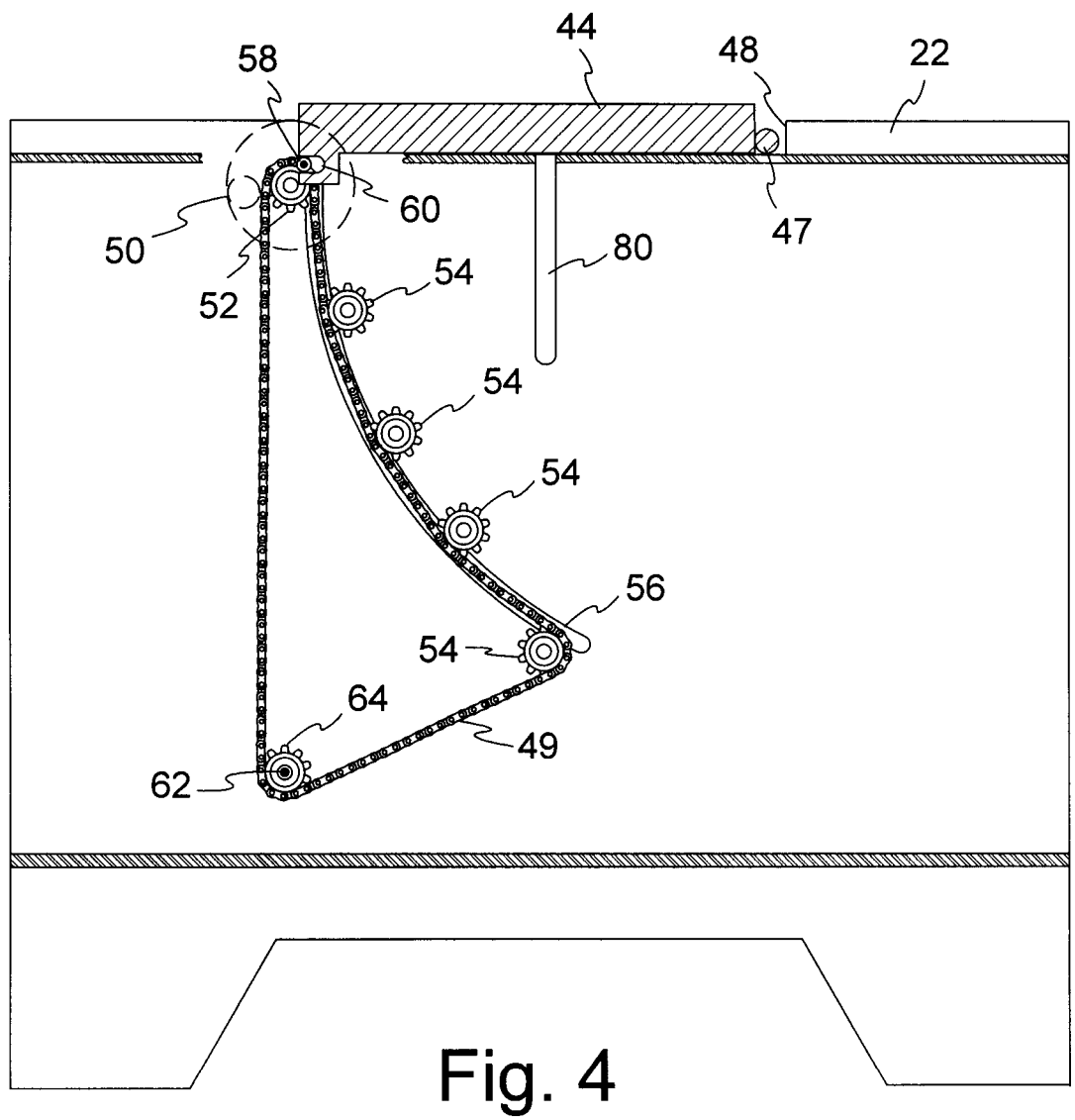
FIG. 4 is a front elevational view of the barbecue grill housing with the front panel of the double front wall broken away and showing the food basket adjusting wheel in phantom. This figure shows a mechanism for moving the food basket. A like mechanism is located between panels of the double back wall.

As best shown in FIG. 4, a sheltered roller chain 49 within the gap of front wall 26 is arranged to move in an endless path. An adjusting wheel 50 on the outside of wall portion 26 is connected to a sprocket 52 in the gap, engaging the chain, and allowing a user to operate the chain. A series of guide sprockets 54 in the gap define a path of chain movement. The inside wall portion 26 defines an arcuate slot 56. The roller chain carries an engagement device that operates through slot 56 to engage the left portion of press basket 44. Thus, adjusting wheel 50 is turned to move the roller chain 49 in either direction, either raising or lowering the left edge of press basket 44 as an engagement device moves through slot 56.

The roller chain 49 and press basket may be engaged by any suitable mechanism. A convenient type of mechanism is a rod or pin 58 that extends through slot 56 and mates the roller chain to the press basket 44. A rod 58 may be attached to the press basket along edge 41 as shown in FIGS. 1 and 3, where the rod includes spring loaded ends 59 for engaging the roller chain through slots 56 at both front and rear walls of housing 22. Alternatively, rod or pins 58 may be joined to the roller chain and may extend centrally into the housing 22, where the press basket removably engages the rod 58 on a mating structure. Such a mating structure on the press basket 44 might be a reception channel 60 carried on the bottom of the basket 44 along edge 41, as viewed in horizontal position. A reception channel 60 can be mounted to the basket, positioned with an open edge to the left in the view of FIG. 3 for receiving a rod 58.

A convenient arrangement would utilize a two-axis engagement system for the basket on the remainder of the grill 20. Considering that the basket 44 would be first engaged with the housing while in a horizontal, top position as illustrated in FIG. 1, it would be suitable to move the basket horizontally to the left, to slide the channel 60 onto the rod or chain pins 58. Then, the right edge of the basket can be dropped onto housing 22, lowering the basket pins 46 onto the tops of walls 26, 30, preferably into recesses 48 in walls 26, 30 at positions corresponding to the right edge of the basket in the view of FIG. 3. The left side channel 60, which is open to the left when the basket is in upper position, will be moved with the basket as the left edge is lowered as suggested in the view of FIG. 2, shifting channel 60 to an open-bottom, vertical orientation. In vertical orientation of the basket, channel 60 is suitably positioned to maintain its engagement to chain pin 58.

The described arrangement of the front wall roller chain 49, the various sprockets that support and guide chain 49, and front wall slot 56 in front wall 26 is duplicated in the rear wall 30. Near the bottom of housing 22, an interconnecting shaft 62 extends between the front and rear walls. The shaft 62 carries a sprocket 64 at each end, coupling the front roller chain and rear roller chain to operate synchronously when adjusting wheel 50 is turned. The coupling means, especially shaft 62, is shrewdly located below the level of the main heat zone so as to avoid excess heating and heat transmission to the opposite chains. The synchronized mechanisms at both front and rear walls of the housing 22 ensure that the basket 44 is well supported for smooth movement.

The previously described and illustrated mechanism for moving the food basket is one suitable example. Other suitable means may accomplish the same or similar function. A mechanical cam can be used as an alternative mechanism, wherein the cam profile dynamically defines the path for chain pins 58 or rod ends 59.

A method of using the press basket 44 in barbecue grill 20 is to orient the basket 44 in approximately horizontal position at the top of its travel. The horizontal position is suited for basket 44 to be opened and filled with foodstuff. Then the basket is closed. Adjusting wheel 50 is turned to operate the elevator mechanism to lower the basket 44 and convert its orientation to approximately vertical. This is done by lowering one side edge of the basket while maintaining the other side edge in a supported position at a substantially constant height near the top of housing 22. Where the supported edge of the basket is suspended from rod 47 that rests near the top of the barbecue housing 22, the rod may provide a handle 63 for manipulating the basket 44. Where rod 47 is supported in an elongated recess 48, the rod 47 provides a means for laterally shifting the position of the press basket 44 in the main heat zone. Rod 47 also permits the basket to be directly lifted from the main heat zone, as may be required from time to time.

Figure 5:
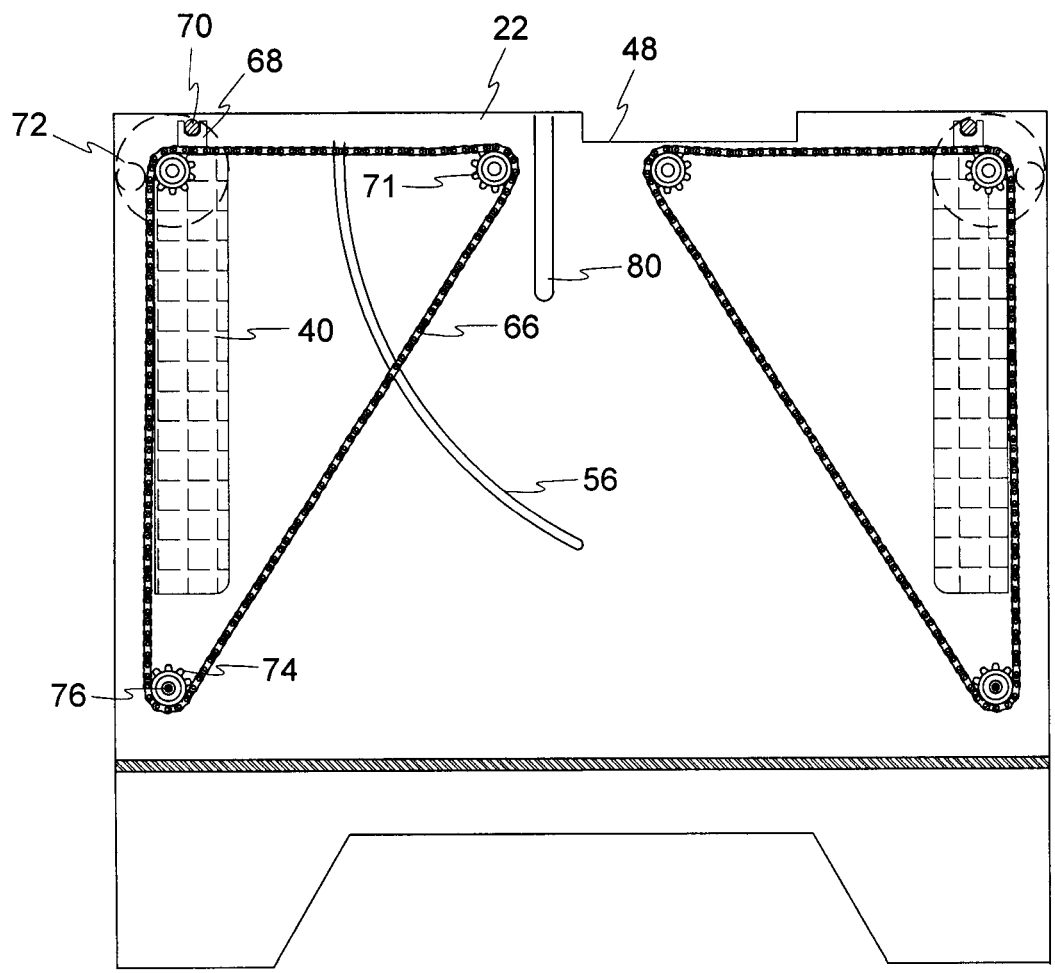
FIG. 5 is a front elevational view of the barbecue grill housing with the front panel of a double front wall broken away and showing the heat panel adjusting wheel in phantom. This figure shows a mechanism for moving a heat panel. A like mechanism is located between panels of the double back wall.
Figure 6:
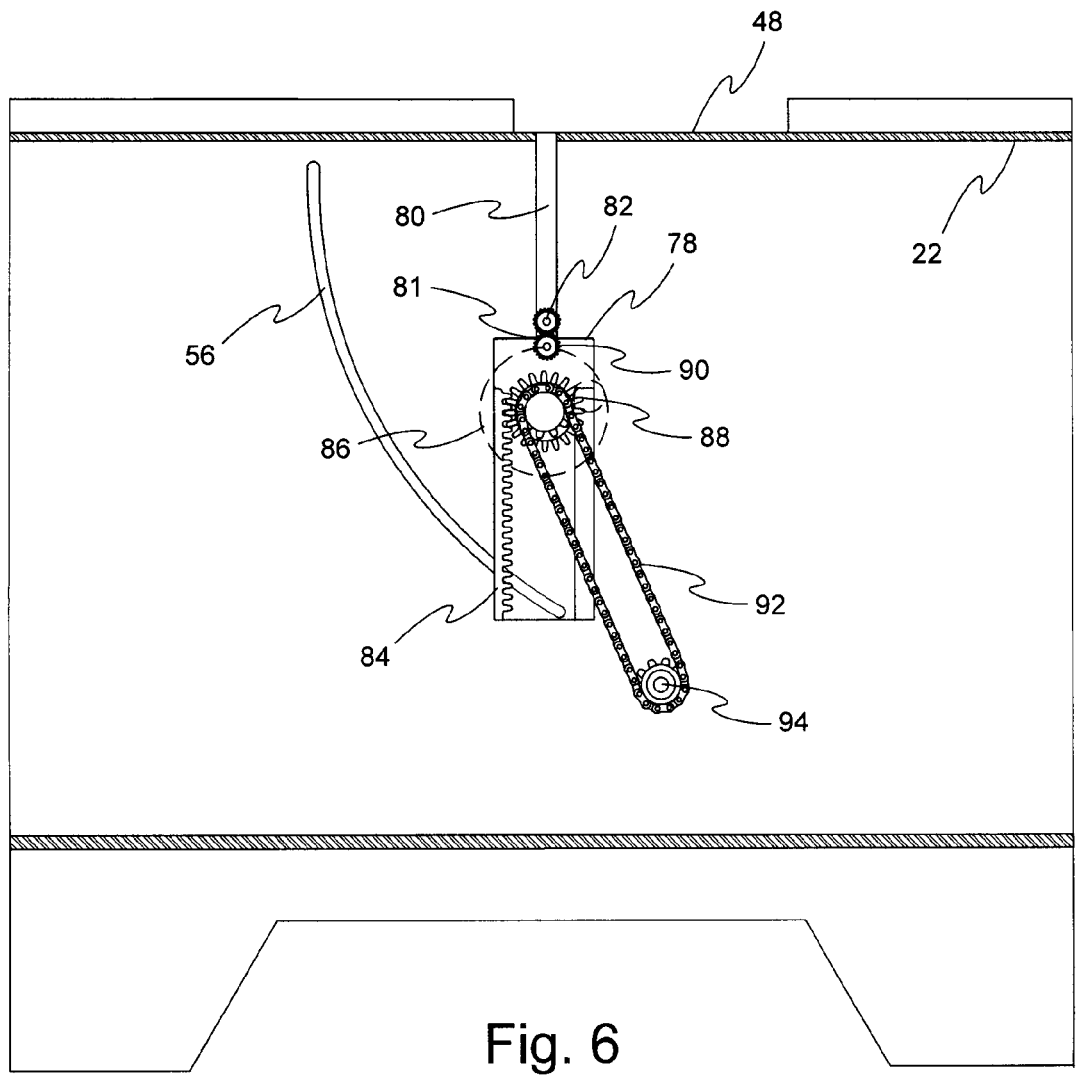
FIG. 6 is a front elevational view of the barbecue grill housing with the front panel of a double front wall broken away and showing the rotisserie control wheel in phantom. This figure shows a mechanism for moving a rotisserie rod. A like mechanism is located between panels of the double back wall.

Optionally, right and left heat panels 40 are supported for selected bidirectional movement, toward and away from the central, main heat zone. Similar to the mechanism for raising and lowering the press basket 44, FIG. 5 shows an example of a heat panel movement means for moving a heat panel toward and away from the central cooking zone. This example shows the arrangement of a roller chain 66 in the gap of front wall 26 for operating a left end heat panel. As previously described, a separate gear box or housing may used in placed of a wall gap, where desired. While one such roller chain is shown at the left end of the front wall 26, a duplicate, paired system is arranged at the left end of the rear wall 30 for operating synchronously with the described system. Further, the right ends of the front wall 26 and rear wall 30, or a separate housing or gear box, contains another paired set of synchronized mechanisms for supporting and moving a right heat panel. Although a single chain system for moving the left heat panels is described, this description could be similarly applied to the other chain systems that perform similar duty of moving or cooperating in movement of a heat panel.

At least one run of the roller chain 66 describes a horizontal path. In the drawing of FIG. 5, the top run is substantially horizontal. The illustrated heat panel 40 in FIG. 5 is a left end heat panel. This heat panel is carried or suspended from the top run of front roller chain 66, such as by an open-topped carrier bracket 68 carried on the top run of the roller chain. The heat panels might be removable from the grill, and hence, it should be readily possible to disengage the heat panel from carrier bracket 68. For this purpose, it is preferred that the brackets 68 be elevated to open positions along the top edge of housing walls. Thus, at least the inside panel of front wall 26 or other chosen walls can be suitably lower than the level of bracket 68 to permit the heat panel 40 to engage bracket 68 along the top run of the chain.

As an example of a suitable mechanism for suspending a heat panel from a bracket 68, the heat panel 40 carries engagement rod or pin 70 that extends into the bracket 68, whether by drop-in positioning or through an access opening in a housing wall. Sprocket 71 at one end of the top run supports and guides the roller chain 66 for movement. An adjusting wheel 72 at an opposite end of the top run operates a drive sprocket 74 to move the roller chain 66 in response to turning of the adjusting wheel 72. The adjusting wheel 72 can move the suspended heat panel toward and away from the main, central heat zone to increase or decrease the temperature of that heat zone. A transfer sprocket 74 at the bottom of the roller chain path is interconnected via a transfer shaft 76 to the similar, paired roller chain system in the rear wall 30.

Optionally the barbecue grill 20 is adapted to accommodate a rotisserie rod in place of press basket 44. The basket 44 should be removed from housing 22 when the rotisserie is used. When used, the rod serves as a spit that can carry suitable food and may be supplemented by additional carrier forks, as well known for rotisserie cooking.

To adapt rotisserie cooking to the advantages enabled by this grill, the barbecue grill 20 is equipped with means for vertically moving the rotisserie rod. As one example of such means, a vertical slide plate or elevator mechanism 78 receives and moves a rotisserie rod between upper and lower positions. The elevator mechanism is duplicated at front and back walls of the grill housing. Elevator slots 80 are formed, for example, in the inside panels of the front and rear walls, or in separate gearboxes or housings carried on the outer front and rear walls, depending from the top edge of each. The elevator mechanism 78 is located in the protected gap between inner and outer panels of front and back walls 26, 30, where double wall construction is used. Of course, a separate gearbox or housing may be substituted for the double front and back walls of the grill housing.

When the slide plate is in upper position, it receives and carries a rotisserie rod at the top of the elevator slots 80, near the level of the top gridirons 42. When the rotisserie rod is engaged in the reception area, the rod extends through the vertical slot 80. The elevator mechanism provides an engagement or reception area 81 suited to receive and carry the rotisserie rod when the rod is placed on a reception area. A suitable reception area might be a dished seat on the top edge of each slide plate. Either or both ends of the rotisserie rod carries a driven gear 82 that can be rotated to drive the rotisserie rod, and the reception area is configured to receive the rod with the driven gear in position to subsequently made with a drive gear.

The slide plate 78 carries a vertical gear rack 84 for elevating or lowering the rack. A control wheel 86 on the front of housing 22 operates a mating pinion gear 88 to raise or lower the gear rack and, hence, the entire slide plate together with the carried rotisserie rod, when present. When the elevator mechanism is in lowered position, the reception area 81 for the rotisserie rod is in lowered position, which places the rotisserie rod in the central cooking zone. A motorized rotisserie gear 90 is positioned near the bottom of the slot to drivingly engage rotisserie rod gear 82 when the slide plate is in lowered position. The control wheel 86 is operated in reverse to raise the slide plate and thereby raise the reception area 81 to the top of housing 22. Reverse operation of the control wheel 86 additionally disengages rotisserie rod gear 82 from rotisserie drive gear 90.

The rotisserie control wheel 86 operates a coupling mechanism with a paired elevator mechanism on the rear wall 30 of housing 22. The control wheel 86 operates a front motion transfer chain 92 that engages an end gear 94 on a rotisserie transfer rod located near the bottom of the housing 22, below the central cooking zone. At the rear wall 30, another gear 94 on the rotisserie transfer rod drives a rear motion transfer chain 92. The rear chain 92 controls a rear pinion gear 88, engaged with a rear rack 84, and operates a rear elevator mechanism 78.

From the description, the grill provides a means and method for cooking food in a heat zone located between vertical heat panels. The heat zone between such panels is exceptionally hot and is especially well suited for searing and quickly cooking meat. The drawback of cooking with lateral or vertical heat panels has been the problem of accessing the basket, controlling the food, and controlling the heat. These problems are overcome by the described controls for either a food basket or a rotisserie. In addition, the barbecue unit 20 allows the press basket to operate at various heights including top level in full horizontal disposition. Alternate types of controls are envisioned, including cams, height adjusting levers, and the like. Similarly, variations in the grill housing are envisioned, including the substitution of independent gearboxes and housings to provide means for sheltering for the various described control systems.

Accordingly, the foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

What is claimed is:

1. A barbecue grill, comprising:
    a housing providing a top cooking level suitable for supporting a gridiron and providing space below the top cooking level;
    at least two opposed heat panels located in said space below the top cooking level, spaced laterally apart to thereby establish a central cooking zone between the heat panels and below the top cooking level, and oriented to direct cooking heat laterally into said central cooking zone;
    a food basket variably oriented with respect to the housing in either an approximately horizontal position or an approximately vertical position, suitably configured to be opened and loaded with foodstuff when in said approximately horizontal position and suitably configured to retain foodstuff when in either position, and suitably sized to at least partially fit in the central cooking zone when in said approximately vertical position;
    a moving means for bidirectionally moving said food basket between the approximately horizontal position and the approximately vertical position, wherein in the approximately horizontal position the moving means locates the food basket near the top cooking level and in the approximately vertical position the moving means locates the food basket in the central cooking zone; and
    a user operated control selectively actuating the moving means to move the food basket toward a selected position.

2. The barbecue grill of claim 1, further comprising:
    sheltering means for sheltering said moving means from thermal and debris contamination.

3. The barbecue grill of claim 1, wherein:
    said housing comprises a front wall and a rear wall, wherein at least one of said front and rear walls is a double wall formed of an inside wall portion and an outside wall portion defining a gap between the inside and outside wall portions thereof; and
    at least a portion of said moving means is located in said gap whereby the inside wall portion shelters said portion of the moving means from thermal and debris contamination.

4. The barbecue grill of claim 3, wherein:
    said food basket is configured with first and second opposite side edges:
    said housing carries said food basket by first engagement near said first side edge;
    said moving means carries the food basket by second engagement near said second side edge;
    said second engagement is connected to a portion of the moving means located in said gap; and
    said inside wall portion defines an opening encompassing a path of movement for the second engagement whereby the second engagement can move the second side edge of the food basket downwardly from said position hear the top cooking level into said central cooking zone.

5. The barbecue grill of claim 1, wherein:
    said food basket is configured with first and second opposite side edges:
    said housing carries said food basket by a first engagement near said first side edge;
    said moving means carries the food basket by a second engagement near said second side edge; and
    said moving means establishes a path of movement for the second engagement whereby the second engagement can move the second side edge of the food basket downwardly from said position hear the top cooking level and into said central cooking zone.

6. The barbecue grill of claim 1, wherein:
    said control is a rotary control operating a chain sprocket; and
    said moving means is a chain operatively engaging said chain sprocket and connected to said food basket, wherein the chain follows a path of movement including a run suitably configured for moving the food basket between said approximately horizontal position and said approximately vertical position.

7. The barbecue grill of claim 1, wherein:
    said housing comprises a front wall and a rear wall, wherein each of said front and rear walls is a double wall defined by an inside wall portion and an outside wall portion defining a gap between the inside and outside wall portions thereof;
    said moving means comprises a first moving means located in said front wall gap and a second moving means located in said rear wall gap; and
    further comprising a coupling means for coupling the first and second moving means for synchronized operation.

8. The barbecue grill of claim 7, wherein:
    said coupling means is located near the bottom of said housing.

9. The barbecue grill of claim 1, wherein:
    said housing comprises a front wall and a rear wall;

said moving means comprises a first moving means carried on said front wall and a second moving means carried on said rear wall; and further comprising a coupling means for coupling the first and second moving means for synchronized operation.

10. The barbecue grill of claim 1, further comprising:

an elevator mechanism carried on said housing at said central cooking zone and including a rotisserie spit engagement near the upper end thereof; and means for vertically moving said rotisserie spit engagement with respect to said central cooking zone.

11. The barbecue grill of claim 10, wherein said means for vertically moving said rotisserie spit engagement with respect to said central cooking zone comprises:

a vertical gear rack carried on said elevator mechanism and operatively engaging a mating pinion gear such that rotation of the pinion gear vertically moves said gear rack and elevator mechanism with respect to said central cooking zone; and a rotary control carried on said housing and operatively connected to said pinion gear to rotate the pinion gear with respect to the vertical gear rack to raise and lower said rotisserie spit engagement.

12. The barbecue grill of claim 11, wherein:

said housing comprises a front wall and a rear wall, wherein at least one of said front and rear walls is a double wall formed of an inside wall portion and an outside wall portion defining a gap between the inside and outside wall portions thereof; and at least a portion of said elevator mechanism is located in said gap whereby the inside wall portion shelters said portion of the elevator means from thermal and debris contamination.

13. The barbecue grill of claim 12, wherein:

said inside wall portion defines a vertical opening encompassing a path of movement for the rotisserie spit engagement whereby the rotisserie spit engagement is moveable along said vertical opening.

14. The barbecue grill of claim 1, wherein:

said housing comprises a front wall and a rear wall, wherein each of said front and rear walls is a double wall formed of an inside wall portion and an outside wall portion defining a gap between the inside and outside wall portions thereof;

further comprising a first elevator mechanism including a first rotisserie spit reception area located in said front wall gap and a second elevator mechanism including a second rotisserie spit reception area located in said rear wall gap; and a coupling means for coupling the first and second elevator mechanisms for synchronized operation.

15. The barbecue grill of claim 1, further comprising:

a heat panel moving means for laterally, bidirectionally moving at least one of said heat panels between a position nearer said central cooking zone and a position further from the central cooking zone.

16. The barbecue grill of claim 15, wherein:

said housing comprises a front wall and a rear wall, wherein at least one of said front and rear walls is a double wall formed of an inside wall portion and an outside wall portion defining a gap between the inside and outside wall portions thereof; and at least a portion of said heat panel moving means is located in said gap whereby the inside wall portion shelters said portion of the heat panel moving means from thermal and debris contamination.

17. The barbecue grill of claim 1, further comprising:

a temperature gauge carried by said housing in a position in communication with said central cooking zone.

\* \* \* \* \*